I. H. A. Herrey.

Skating Rink.

No. 3,293. Reissued Feb. 9, 1869.

WITNESSES:

W. J. A. Fuller.

Leon. Abbett.

INVENTOR:

I. H. A. Herrey

N. PETERS, PHOTO-LITHOGRAPHER, WASHINGTON, D. C.

UNITED STATES PATENT OFFICE.

I. H. A. HERVEY, OF CLEVELAND, OHIO.

SKATING-RINK.

Specification forming part of Letters Patent No. 73,806, dated January 28, 1868; Reissue No. 3,293, dated February 9, 1869.

*To all whom it may concern:*

Be it known that I, I. H. A. HERVEY, of Cleveland, in the county of Cuyahoga and State of Ohio, have invented a new and convenient Means of Providing for the Amusement of Skating, which I call a "Skating-Rink;" and I do hereby declare the following to be a full, clear, and exact description thereof, which will enable others skilled in the art to make and use the same, reference being had to the accompanying drawings, forming part of this specification.

The leading features of my invention are, first, the housing over of a sheet of ice, or the formation of a sheet of ice within a covered building, for the use of skaters; and, second, the formation of a solid ice-floor resting directly upon a foundation of clay or some other imperfect conductor of heat, in contradistinction to skating-ponds, whether artificial or natural, which, previous to the date of my invention, consisted merely of a crust of ice resting upon a body of water, and not inclosed within a covered building. By my invention the water within the building or skating-rink is easily made to freeze, and can be kept in a frozen state when the temperature of the external air in the shade is not more than two or three degrees above the freezing-point. A high temperature within the rink is avoided by the use of suitable means of ventilation, and the ice is also protected from being thawed or melted by the rays of the sun.

The required ventilation is obtained by providing the building with several series of openings at different heights, the higher series of openings, at or near the roof, being for the escape of rarefied air, and the lower series, at or near the ground, being for the introduction of cold air for freezing purposes.

The building may be constructed of wood or other material, and of such dimensions and shape upon the ground as may be convenient. I usually make the side walls about twenty feet in height, and cover the building with a double pitched roof.

Figure 1:
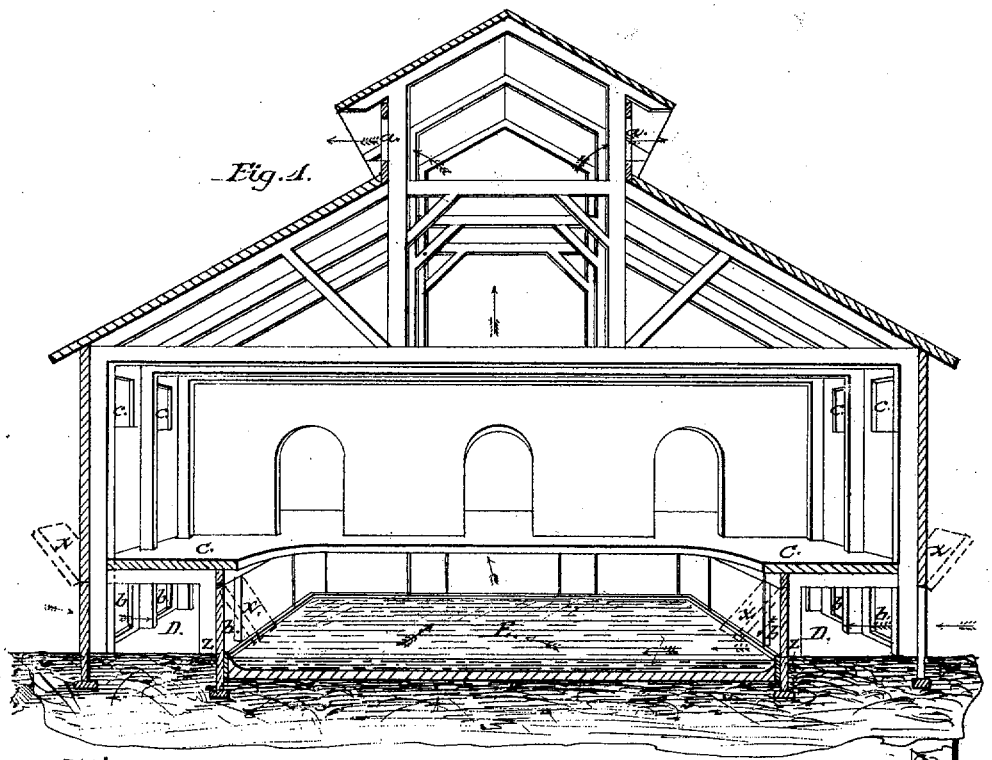

Figure 1 is a transverse section of a skating-rink, showing a portion of the interior in perspective.

The upper part of the roof is provided with openings *a*, for the escape of rarefied air, the direction of the current being shown by the arrows, and another series of openings, *b*, provide for the admission of cold air.

The latter produce the best results when nearly on a level with the surface which is to be covered with ice, and may be provided with doors *x x'*, which may be wholly or partially closed, and the admission of cold air thus regulated at pleasure.

When both these inner and outer doors are open the cold air is admitted into the rink directly over the ice-surface, and the water will not only freeze expeditiously, but, when frozen, is prevented from thawing or melting readily, for the temperature within the rink may be kept as low as that of the external air, and even lower, in mild sunny days.

I have found it convenient, in a skating-rink, to surround the ice-basin with a platform, C, rather above the level of the ice-surface, for the accommodation of spectators, and in that case have inclosed the space underneath this platform, so as to make what I call a cold-air trunk, D, extending entirely or partially around the interior of the rink, arranging, at suitable distances apart, a double series of openings, the one set, *b*, in the side of the building, to admit cold air from without into the trunk, and the other set, *b'*, to admit cold air from the trunk to the surface of the ice-basin E, as I have stated.

In cold weather these doors *b b'*, at both sides of the cold-air chamber or trunk D, may be closed, as it is designed to have the temperature within the rink as high as may be compatible with the proper preservation of the ice.

The elevated platform and cold-air trunk may be dispensed with, if desired, or the openings for the supply of cold air may be placed above the platform, neither the platform nor the cold-air trunk being absolutely necessary to the successful operation of my invention, although both are convenient and useful.

To freeze the water in the rink, it is absolutely necessary to have either doors, windows, or openings of some kind to admit a current of outer air, and the more openings there are, and the nearer the ice-surface, the better.

If the openings are above the platform they may answer the purpose in a cold climate; but they will not attain the desired end so well as if below the platform and nearly on a level with the ice-surface.

I arrange the entrances to the building with double doors or inclosed porches or vestibules, to prevent the admission of external air when the same is at too high a temperature, and I provide small windows or openings for the admission of light, *c*, Fig. 1, in the sides of the building, above the platform C, located sufficiently high to prevent the rays of the sun from striking upon the ice-surface.

Figure 2:
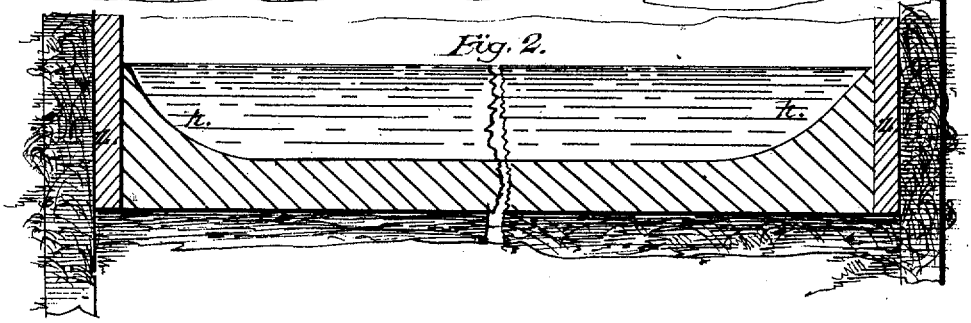

I prepare the ice-basin by grading the surface of the earth to be occupied as nearly level as possible, and surrounding it with a two-inch plank, say twelve inches wide, set upon edge, and secured to posts set into the ground at proper intervals, as shown at Z, Fig. 2. I then fill in this space with clay to the depth of three inches or more, and, by wetting, rolling, and pounding, make a hard, smooth, level surface. I build up the clay around the edges and against the plank to the height of about six inches, beveling it down to the inner surface of the basin, somewhat in the shape of a saucer, as shown at *h*, Fig. 2.

I use clay for the basin, because it is an imperfect conductor of heat, and can be made both air and water tight. Moreover, when water is frozen upon it the ice adheres as if it were an integral part of the clay, and the result is the ice will not be hollow or shelly; but will freeze solid and smooth, and thus be preserved longer from melting, as it can thaw only upon its upper surface.

If asphaltum or board floors or boulevard pavement be used in place of clay, the ice does not adhere firmly, and skating upon it soon breaks it up.

The practical operation of my invention is as follows: The cold season having arrived, the ventilators are all opened, and the cold external air enters through the lower openings and covers the clay basin. Having reduced that to the lowest available temperature—*i. e.*, to the temperature of the air outside the building—I next proceed to flood it with water so slowly and gradually that the water freezes solid almost as fast as it finds its level after being put on. Having formed a complete coating of ice directly upon the surface of the clay, I again flood it, using the same care against putting on too much water at a time, and continue this operation until I form a solid mass of ice of the required thickness and smoothness of surface for skating purposes.

By my process new ice may be made on the surface of the old ice during weather when the ice in ponds outside the building will not increase in thickness at all. It takes a greater degree of cold to thicken ice in ponds, because the water is partially protected from the cold by the ice above it, whereas in my process the water is exposed to the cold air, and the new ice is made on top of the old ice, instead of on the bottom.

Having thus described my invention, and its mode of operation, I claim as my own invention, and desire to secure by Letters Patent of the United States—

1. The construction and arrangement of a basin within a building, in combination with openings in the building for the introduction of cold air, substantially as described, and for the purposes set forth.

2. The arrangement of openings around a basin within a building, in combination with higher openings in the building, the latter being for the exit of air therefrom, the whole substantially as described, and for the purposes set forth.

3. A skating-rink provided with a cold-air trunk, D, extending partially or entirely around its foundation or lower part, and provided with doors *b b'* at its inner and outer sides, for the admission of external air, in connection with the openings *a* in the roof of the rink, all constructed and arranged substantially in the manner as and for the purposes set forth.

I. H. A. HERVEY.

Witnesses:
CHAS. B. F. ADAMS,
S. N. FULLER.